(12) United States Patent
Narita

(10) Patent No.: US 7,200,421 B2
(45) Date of Patent: Apr. 3, 2007

(54) BASE STATION DEVICE ACHIEVING EFFECTIVE USE OF FREQUENCIES BY CHANGING STRUCTURES OF ANTENNAS

(75) Inventor: Masahiro Narita, Gifu (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 350 days.

(21) Appl. No.: 10/963,552

(22) Filed: Oct. 14, 2004

(65) Prior Publication Data
US 2005/0085266 A1  Apr. 21, 2005

(30) Foreign Application Priority Data
Oct. 20, 2003 (JP) .............................. 2003-359851

(51) Int. Cl.
H04B 1/38 (2006.01)
H04B 1/16 (2006.01)
H04B 1/02 (2006.01)

(52) U.S. Cl. ................... 455/561; 455/101; 455/277.1

(58) Field of Classification Search ................ 455/561, 455/560, 562.1, 73, 550.1, 270, 272, 273, 455/275, 277.1, 279.1, 133, 101
See application file for complete search history.

(56) References Cited

U.S. PATENT DOCUMENTS

| | | | | |
|---|---|---|---|---|
| 6,085,076 A | * | 7/2000 | Lindsay et al. | 455/277.1 |
| 6,360,088 B1 | * | 3/2002 | Shi et al. | 455/277.1 |
| 6,445,910 B1 | * | 9/2002 | Oestreich | 455/277.1 |
| 6,553,078 B1 | * | 4/2003 | Åkerberg | 375/267 |
| 6,700,865 B1 | * | 3/2004 | Yamamoto et al. | 370/208 |
| 7,006,809 B2 | * | 2/2006 | Petrov et al. | 455/276.1 |
| 7,106,271 B1 | * | 9/2006 | Friday | 343/853 |

FOREIGN PATENT DOCUMENTS

JP  3326416  7/2002

* cited by examiner

Primary Examiner—Sonny Trinh
(74) Attorney, Agent, or Firm—Foley & Lardner LLP

(57) ABSTRACT

A base station device provided with a plurality of antennas has a mode, in which all the antennas are used, and a mode, in which the plurality of antennas are divided into a plurality of groups each including two or more antennas to be used independently. An array antenna pattern is formed selectively in these modes. When the array antenna pattern is to be formed in the mode of using all the antennas, a signal of one synthesizer is applied to transmission/reception circuits of all the antennas. In the mode of using antennas divided into the plurality of groups, signals of different synthesizers are supplied to the transmission/reception circuits of the antennas.

4 Claims, 4 Drawing Sheets

BASE STATION DEVICE ACHIEVING EFFECTIVE USE OF FREQUENCIES BY CHANGING STRUCTURES OF ANTENNAS

BACKGROUND OF THE INVENTION

1. Field of the Invention

The present invention relates to a base station device, and particularly to a base station device provided with a plurality of antennas.

2. Description of the Background Art

Cellular phone systems and handy cellular phone systems are now in widespread use among many users. In these systems, terminal devices perform predetermined data communication over channels allocated by a base station device. One base station device allocates a plurality of channels to terminal devices, and multiplexes these terminals. Particularly, the cellular phone systems and handy cellular phone systems generally use a TDMA (Time Division Multiple Access) system as a multiplexing technique. According to the TDMA system, a time axis is divided into predetermined time periods called "time slots", and these times slots are allocated to the respective users for multiplexing.

An antenna directivity control technique based on an adaptive array antenna has been studied as a technique for achieving stable connection with the terminal devices.

More specifically, an adaptive array base station device provided with antennas of n in number is configured such that phases and amplitudes of transmission/reception circuits of n in number are operated as follows. In the reception operation, a suitable phase difference and a suitable amplitude ratio are applied to a reception signal of each antenna for combination so that a reception gain is increased selectively in a desired direction. In the transmission operation, these suitable phase difference and amplitude ratio are applied to a transmission signal for each antenna so that a transmission gain is increased selectively in this desired direction.

Thereby, it is possible to improve gains of the reception and transmission with respect to the terminal device requiring the communication so that more stable communication can be achieved.

A technique for achieving effective use of frequencies according to the antenna directivity control technique has also been proposed (Japanese Patent No. 3326416).

According to this technique, the base station device with the plurality of antennas can attain two modes, i.e., an all-antenna mode and a group mode. In the all-antenna mode, all the antennas are used to form an array antenna pattern. In the group mode, the plurality of antennas are divided into a plurality of groups each including two or more antennas, and different frequencies are used for these groups to form individual array antenna patterns, respectively. Switching is done between these modes, and thus between use of one wave and use of multiple waves in accordance with the number of connections by the users. Thereby, frequency resources are efficiently used, and more users can be accommodated according to the above technique.

Under these circumstances, the inventors have recognized the following disadvantages.

For example, when all antennas are used to form an array antenna pattern in a technique disclosed in Japanese Patent No. 3326416, a plurality of local synthesizers are set to the same frequency. However, if hardware does not have completely the same characteristics, differences in characteristic affect characteristics of the adaptive array. Thereby, interference removal is not performed so that transmission/reception characteristics deteriorate.

SUMMARY OF THE INVENTION

An object of the invention is to provide a base station device, which can effectively use frequencies by changing structures of antennas, and particularly can prevent deterioration of transmission/reception characteristics.

An aspect of the invention provides a radio communication device. This device includes a plurality of local oscillation units generating local frequency signals; a plurality of radio units using the local frequency signals as input for operation; a path switching switch arranged between the plurality of local oscillation units and the plurality of radio units for selecting connections between the local oscillation units and the radio units; a transmission/reception form switching control unit performing switching between a transmission/reception operation using the same frequency in all the plurality of radio units and a transmission/reception operation performed by dividing the plurality of radio units into a plurality of groups and using different frequencies in the respective groups; and a path switching control unit controlling the path switching switch to connect the one local oscillation unit to all the radio units when the transmission/reception form switching control unit performs the transmission and reception by all the radio units, and controlling the path switching switch to connect the different local oscillation units corresponding to the respective groups to the radio units, respectively, when the transmission/reception form switching control unit performs the transmission and reception by each of the groups.

The device may further include a power supply control unit controlling supply of a power to the local oscillation unit, and the power supply control unit may control the path switching switch to shut off the power to the local oscillation unit not connected to the radio unit.

The transmission/reception form switching control unit may perform selection on a slot-by-slot basis of a radio signal to select the transmission/reception operation by all the radio units or the transmission/reception operation by the radio units corresponding to each of the groups.

Further, the device may include a storage unit storing correction information for radio characteristics corresponding to the number of the paths set by the path switching control unit between the plurality of local oscillation units and the plurality of radio units, and the storage unit may commonly use the correction information for the path(s) included in the paths between the local oscillation units and the radio units and commonly used in both the case of the transmission/reception operation by all the radio units and the case of the transmission/reception operation by the radio units corresponding to each of the groups.

According to the above structures, the structures of the radio units are changed to prevent deterioration of the transmission/reception characteristics in the base station device effectively utilizing the frequencies.

Changes and modifications may be made in combination of the foregoing components as well as manner, device, system, record media and computer program representing the invention, and such changes and modifications are also effective forms of the invention.

According to the invention, the base station device, in which the structure of the radio unit is changed for effectively utilizing frequencies, can prevent deterioration of the transmission/reception characteristics.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment relates to a base station device including a plurality of antennas as well as transmission/reception circuits provided for the respective antennas. The base station device has a mode, in which all the antennas are used, and a mode, in which the plurality of antennas are divided into a plurality of groups each including two or more antennas to be used independently. An array antenna pattern is formed selectively in these modes. When the array antenna pattern is to be formed in the mode of using all the antennas, a signal of one synthesizer is applied to transmission/reception circuits of all the antennas. In the mode of using antennas divided into the plurality of groups, signals of different synthesizers are supplied to the transmission/reception circuits of the antennas.

Specific examples of a base station device in a handy cellular phone system will now be described in detail.

Figure 1:
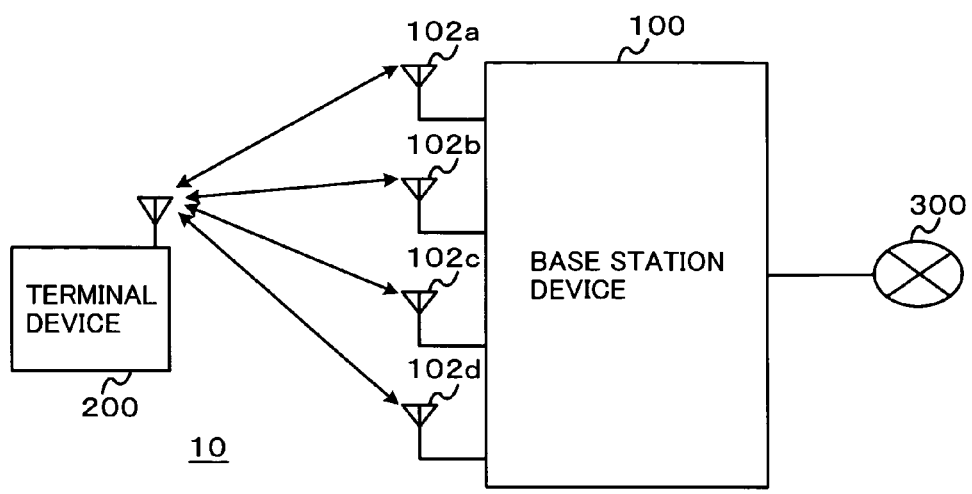
FIG. 1 shows a communication system according to an embodiment.

FIG. 1 shows an example of an operation state of a communication system 10 according to the embodiment. Communication system 10 includes a base station device 100, a terminal device 200 and a network 300.

In FIG. 1, base station device 100 includes four base station antennas 102, and uses all four base station antennas 102 to form an array pattern for the terminal device. This form of connection will be referred to as a "all-antenna mode" hereinafter.

Figure 2:
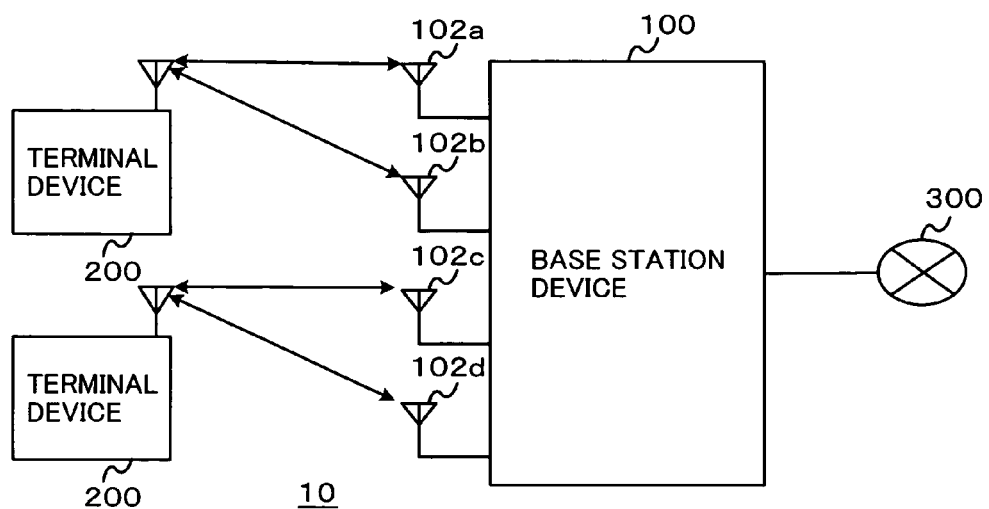
FIG. 2 shows a communication system according to an embodiment.

FIG. 2 shows another example of the operation mode of communication system 10 according to the embodiment.

In FIG. 2, four base station antennas 102 are divided into two groups each including two base station antennas 102a and 102b (or 102c and 102d), and an array antenna pattern is formed by each group. This connection form will be referred to as a "group mode" hereinafter.

Figure 3:
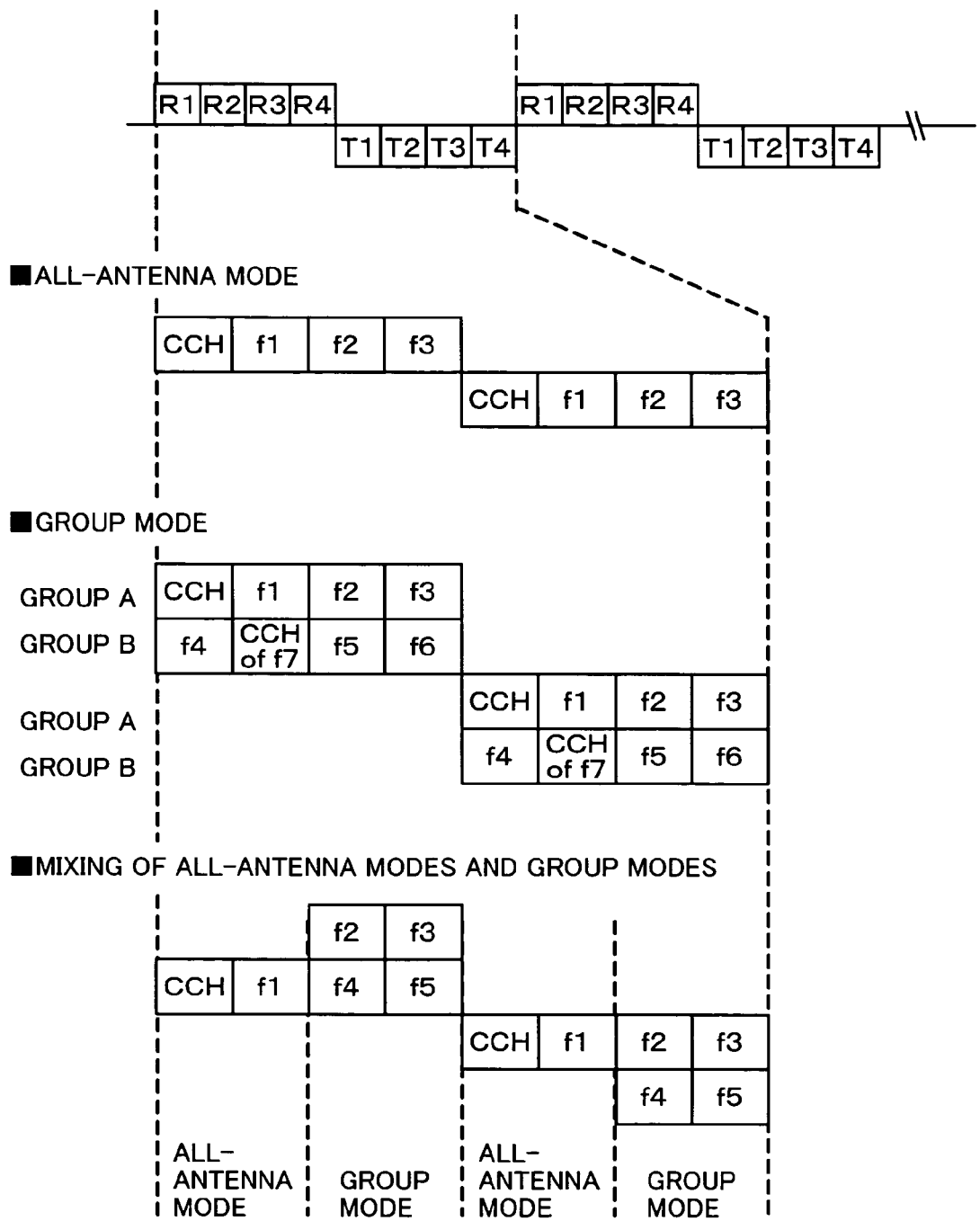
FIG. 3 illustrates frame formats according to an embodiment.

FIG. 3 shows structures of radio channels allocated by base station device 100.

In this embodiment, time-division multiplex is achieved by multiplexing four channels for each of TDMA/TDD frames.

In this description, the TDMA/TDD frame has a period of 5 mS, and is formed of four up-link (from the terminal device to the base station device) time slots and four down-link (from the base station device to the terminal device) time slots, which are produced by equally dividing the frame into eight parts.

In the all-antenna mode of this embodiment, which corresponds to the operation state in FIG. 1, the four up-link time slots and the four down-link time slots are allocated such that one of the four time slots is allocated to a control information channel, i.e., channel (CCH) for control information, and the other three time slots are allocated to speech communication channels, i.e., channels (f1–f3) for speech communication, and multiplexing of three users is performed.

The group mode, which uses the antennas divided into the plurality of groups, corresponds to the operation state shown in FIG. 2. In this group mode, each of groups A and B includes four up-link time slots and four down-link time slots, and thus includes eight time slots in total. Among the eight time slots, one or two time slot(s) are allocated to control channel(s) (CCH), and the others are allocated to speech communication channels (f1–f6 or f7), respectively. Thereby, multiplexing of users is performed.

Further, the mode can be switched between the "all-antenna mode" and the "group mode" based on the time axis, and this switching is performed, e.g., on a time slot basis as illustrated information 3.

Figure 4:
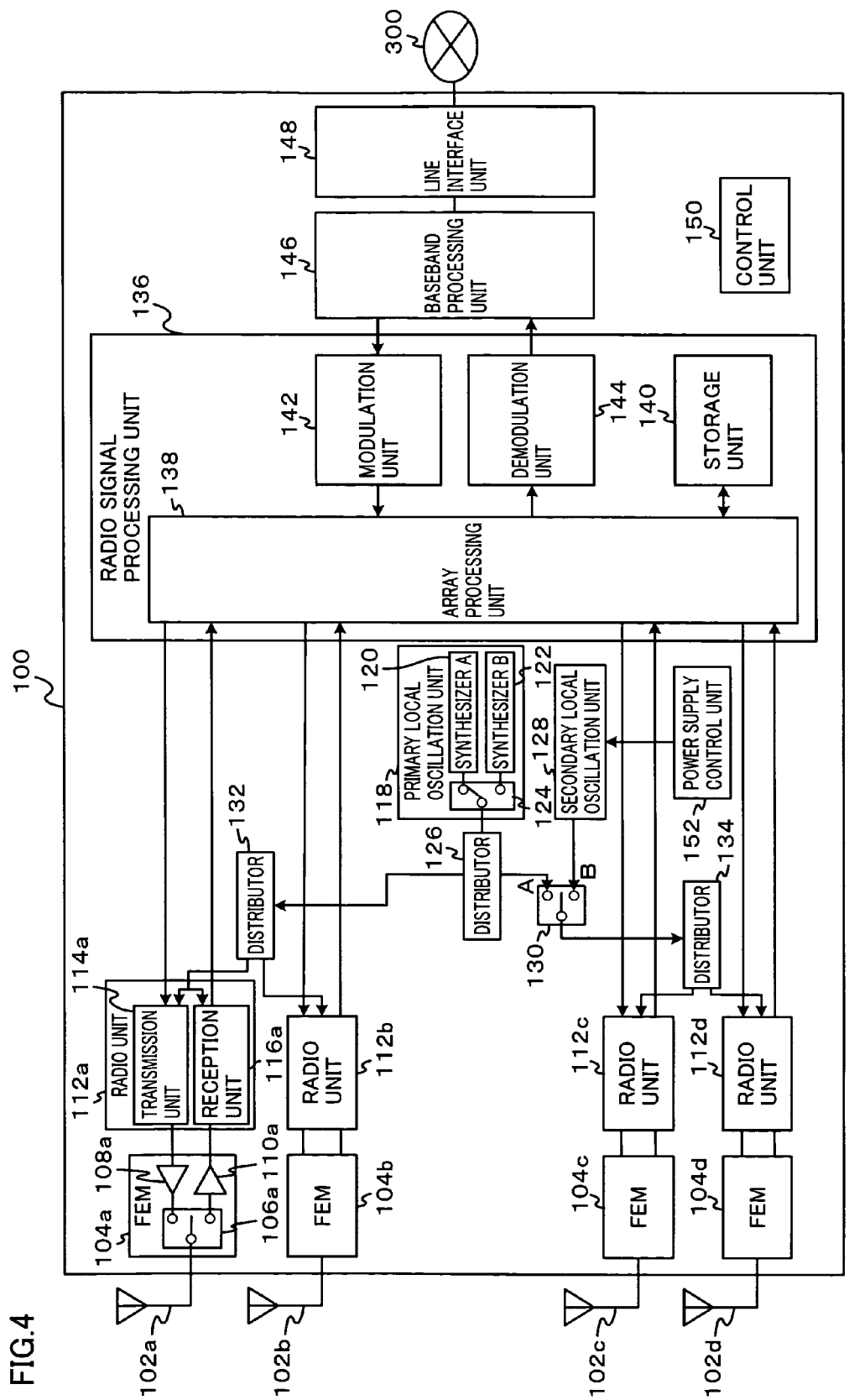
FIG. 4 shows a structure of a base station device according to an embodiment.

FIG. 4 shows a structure of a base station device 100 according to the embodiment.

Base station device 100 includes first to fourth base station antennas 102a, 102b, 102c and 102d, which will be generally referred to as "base station antennas 102" hereinafter, as well as first to fourth FEMs (Front End Modules) 104a, 104b, 104c and 104d, which will be generally referred to as "FEMs 104" hereinafter. Base station device 100 also includes first to fourth radio units 112a, 112b, 112c and 112d, which will be generally referred to as "radio units 112" hereinafter, as well as a primary local oscillation unit 118, a secondary local oscillation unit 128, a distributor 126, a path switching switch 130, distributors 132 and 134, a radio signal processing unit 136, a baseband processing unit 146, a line interface unit 148, a control unit 150 and a power supply control unit 152.

Each FEM 104 includes a transmission/reception switch 106, a power amplifier 108 and a low-noise amplifier 110. Each radio unit 112 includes a transmission unit 114 and a reception unit 116. Primary local oscillation unit 118 includes synthesizers A120 and B122, and a switch 124. Radio signal processing unit 136 includes an array processing unit 138, a storage unit 140, a modulation unit 142 and a demodulation unit 144.

Base station antenna 102 transmits and receives signals at radio frequencies.

FEM 104 is formed of a power amplifier 108, which amplifies a signal provided from radio unit 112 to produce a transmittable electric power, a low-noise amplifier 110 amplifying the received radio signal, and an antenna transmission/reception switch 106 switching the operation between transmission and reception on a time division basis.

Radio unit 112 is a circuit performing frequency conversion, A/D conversion and D/A conversion of radio signals, and is formed of transmission unit 114 and reception unit 116.

Primary local oscillation unit 118 provides a local frequency signal for use in various kinds of processing such as frequency conversion in the radio unit. This oscillation unit internally has two frequency synthesizers, and can produce different local frequency signals corresponding to respective time slots.

Secondary local oscillation unit 128 has a structure similar to primary local oscillation unit 118, and is supplied with a power, which is controlled via power supply control unit 152 by control unit 150 to be described later.

Each of distributors 126, 132 and 134 distributes the local frequency signal provided from primary local oscillation unit 118 or secondary local oscillation unit 128 to two portions.

Path switching switch 130 selectively provides the local frequency signals, which are provided from primary and local oscillation units 118 and 128, in accordance with an instruction of control unit 150, which will be described later.

Array processing unit 138 performs adaptive array antenna signal processing, and performs the functions for the terminal devices, respectively.

More specifically, in the all-antenna mode, array processing unit 138 calculates a weight amount (a gain and a phase to be adjusted by a phase/amplitude adjusting unit) for forming an array antenna pattern such that a directivity can be obtained by handling the four antennas as one array antenna.

In the group mode, array processing unit 138 calculates the weight amount for forming an array antenna pattern such that a directivity can be obtained by handling the antennas in each of groups A and B as one array antenna.

The array antenna pattern of a reception or transmission signal (i.e., the signal to be received or transmitted) is formed by adjusting an amplitude and a phase amount applied to the transmission or reception signal for each of the antennas when the signals are to be received or transmitted by or from the plurality of antennas.

Adjustment of the amplitude is performed by adjusting, e.g., a gain of a transmission/reception unit corresponding to the antenna, or is performed by adjusting an amplitude of the reception signal or transmission signal itself for each antenna, and thereby the amplitude of the signal is adjusted corresponding to each antenna.

The adjustment of the phase is performed by adding the phase of the signal itself corresponding to each antenna.

For performing the adaptive array processing, storage unit 140 stores correction information of respective systems, which was obtained in advance, for the purpose of correcting a phase difference and an amplitude difference between the transmission circuit and the reception circuit.

The correction information thus stored is information used for correcting the differences in phase and amplitude, which occur due to the fact that differences are present in path pattern and element characteristic between the systems, and the correction processing is executed in the actual operation and processing by a DSP (Digital Signal Processor) or CPU (Central Processing Unit) based on this correction information.

According to a conventional structure having an individual local oscillator in each system, there are differences in characteristic of the oscillator and in supply path of the output signal (local signal) between the systems so that correction information for such differences is additionally required.

According to the embodiment, however, the local oscillator and the supply path of its output signal are shared in each group. Therefore, there is no information for correcting the difference in characteristic of the oscillator, and the correction information can be used in a shared manner by the shared path among the supply paths of the output signals.

Modulation unit 142 modulates the information signal to be transmitted, and provides the modulated signal to array processing unit 138.

Demodulation unit 144 receives the reception signal of each terminal device processed by array processing unit 138, and demodulates it to reproduce the information signal.

Baseband processing unit 146 performs the signal processing such as TDMA or TDD.

Line interface unit 148 is an interface to network 300.

Control unit 150 controls operation timing of whole base station device 100, and further operates to switch the mode between the all-antenna mode and the group mode in accordance with a traffic amount (the number of terminal devices connected by radio communication and an amount of packets) and others in radio signal processing unit 136.

For achieving the above structure by hardware, an appropriate CPU, memory or another LSI of a computer can be used. For achieving the above structure by software, a program, which is stored on a memory (not shown) and is read out for execution, can be used. In the figures, these are linked to achieve function blocks of the above structure. Therefore, it will be understood by those skilled in the art that these function blocks can be achieved in various manners by only hardware, only software or combination thereof.

An operation of communication system 10 having the above structures will now be described.

In FIG. 1, a circuit portion formed of base station antenna 102a, FEM 104a and radio unit 112a performs frequency conversion of the radio frequency and the baseband signal by using the local frequency signal provided from primary local oscillation unit 118, and thereby performs transmission and reception of the signal.

Base station antenna 102b, FEM 104b and radio unit 112b likewise perform frequency conversion of the radio frequency and the baseband signal by using the local frequency signal provided from primary local oscillation unit 118, and thereby perform transmission and reception of the signal.

Base station antenna 102c, FEM 104c and radio unit 112c as well as base station antenna 102d, FEM 104d and radio unit 112d use the local frequency signal provided selectively from primary and secondary local oscillation unit 118 and 128 via path switching switch 130, and thereby perform the frequency conversion of the radio frequency and the baseband signal for transmitting and receiving the signals.

For this selection of the path in the all-antenna mode, control unit 150 controls path switching switch 130 to select primary local oscillation unit 118 (side A in FIG. 4).

In this state, control unit 150 controls and instructs power supply control unit 152 to shut off the power of secondary local oscillation unit 128, which is in the state not connected to a destination of the signal, and thereby not to operate secondary local oscillation unit 128.

Thereby, secondary local oscillation unit 128 does not generate unnecessary frequency components due to operation of the synthesizer and others so that the spurious performance can be improved.

In the group mode, control unit 150 controls path switching switch 130 to select secondary local oscillation unit 128 (side B in FIG. 4). In this state, control unit 150 instructs power supply control unit 152 to operate secondary local oscillation unit 128 by supplying the power thereto so that groups A and B perform the communication at different frequencies, respectively.

Further, when the all-antenna modes and the group modes are mixed as illustrated in FIG. 3, the path switching switch 130 is operated for every slot so that primary local oscillation unit 118 (side A in FIG. 4) is selected in the all-antenna mode, and secondary local oscillation unit 128 (side B in FIG. 4) is selected in the group mode.

In this state, power supply control unit 152 supplies the power during periods of lock-on of the synthesizer and the operation in the group mode under the control of control unit 150.

The all-antenna mode and the group mode are appropriately selected according to the number of users performing the communication, e.g., as follows. Control unit 150 monitors the processing of radio signal processing unit 136 and baseband processing unit 146, and switches the mode from the all-antenna mode to the group mode when the number of the communicating users exceeds a predetermined threshold value.

An operation of radio signal processing unit 136 will now be described.

For radio reception from terminal device 200, array processing unit 138 knows in advance, e.g., such properties of the reception signal that a complex envelope of the signal is constant, and successively calculates weights, which can be added to signals to exhibit a constant complex envelope. Alternatively, a portion of the desired signal received from a party on the other end, and particularly, the portion, of which contents are already known (i.e., a portion of UW in the case of the radio signal) is processed by performing a comparison between a signal to be originally received and a signal added to array processing unit 138, and weights reducing differences between them are successively calculated. The control in the above manners provides the reception directivity, which selectively increases the reception gain in the coming direction of the desired signal.

In the transmitting operation, the weights obtained in the receiving operation are used as the weights of the transmission signals of the respective antennas. Thereby, the same directivity as that in the receiving operation is formed in the transmitting operation, and the transmission signal is selectively transmitted in the coming direction of the foregoing desired signal. However, it is necessary to calibrate an amplitude difference and a phase difference between the transmission and reception systems so that the directivity in the transmission operation may match with the desired signal.

According to the structure described above, in the all-antenna mode, the primary local oscillation unit 118 provides the local signals to all radio units 112a–112d so that such a situation can be prevented that a difference in characteristic of the hardware affects the characteristics of the adaptive array to deteriorate transmission/reception characteristics. In both the all-antenna mode and the group mode, base station antennas 102a and 102b are supplied with the local signals via the same path from the primary local oscillation unit 118 so that the same calibration data can be used for correcting the array characteristics, and it is possible to reduce arithmetic circuits and memory space required for processing thereof.

At the same time, the calibration operation itself is reduced by using the same path so that the required time can be reduced.

Further, during the operation in the all-antenna mode, the power to the secondary local oscillation unit 128 is shut off so that unnecessary spurious is not caused, and the base station device can have excellent characteristics.

Although the present invention has been described and illustrated in detail, it is clearly understood that the same is by way of illustration and example only and is not to be taken by way of limitation, the spirit and scope of the present invention being limited only by the terms of the appended claims.

The above embodiment employs primary and secondary local oscillation units 118 and 128 as output sources of the local frequency signals. However, this is not restrictive. For example, such a structure may be employed that does not use primary local oscillation unit 118 in the group mode, and further includes a secondary local oscillation unit 160.

Figure 5:
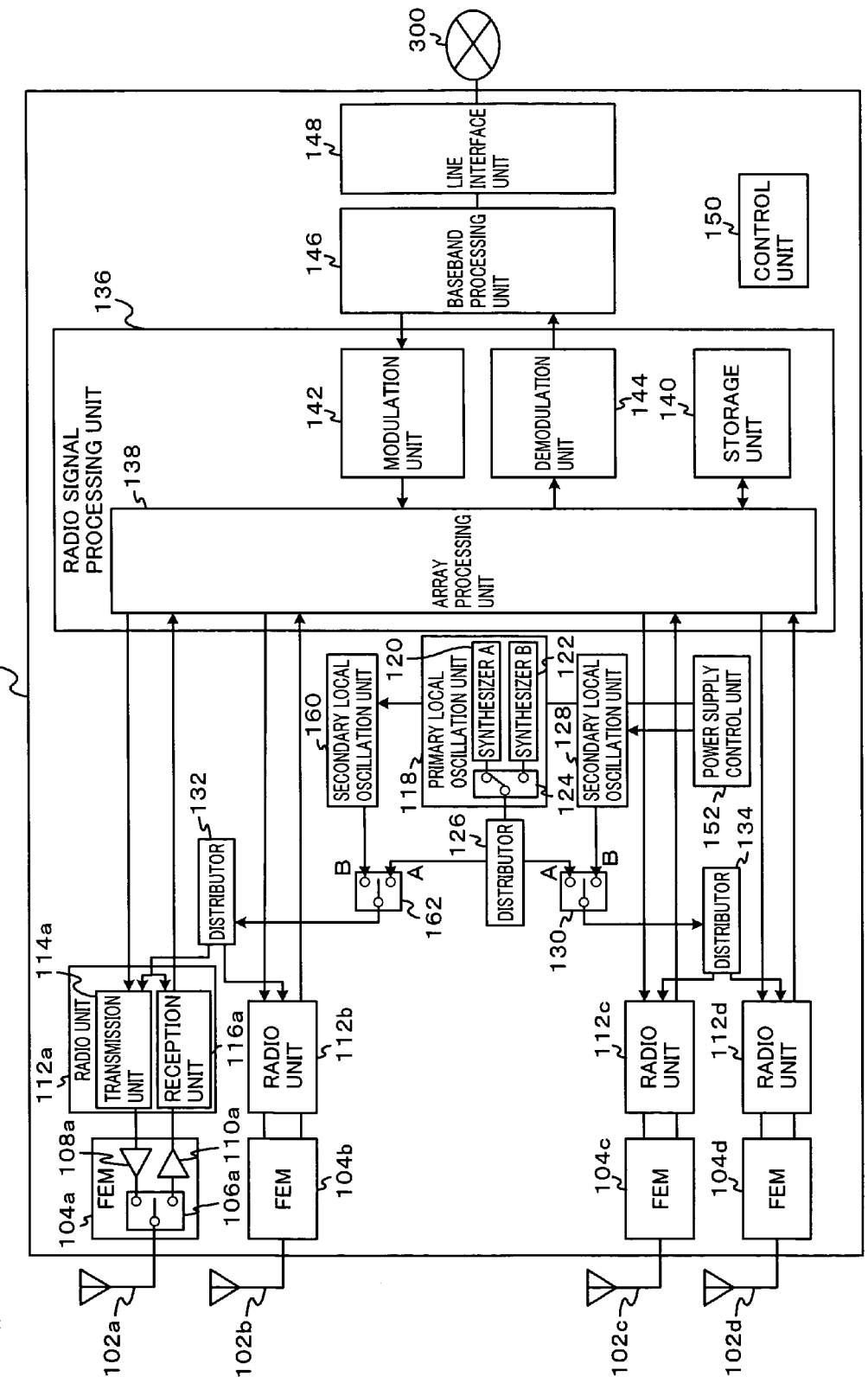
FIG. 5 shows a structure of a base station device according to an embodiment.

FIG. 5 shows a structure further including secondary local oscillation unit 160. In this structure, secondary local oscillation unit 160 and a path switching switch 162 are added to the structure shown in FIG. 4.

When this structure operates in the all-antenna mode, both path switching switches 130 and 162 are set to select the local frequency signal of the primary local oscillation unit 118.

When it operates in the group mode, path switching switches 130 and 162 are set to select the local frequency signals of secondary local oscillation units 128 and 160, respectively, and thus to select the side B in FIG. 5.

According to this structure, secondary local oscillation units (128 and 160) can be arranged near the radio units to be connected thereto, respectively, so that isolation can be ensured between the systems, and thus the characteristics in the group mode can be improved.

The embodiment has been described in connection with the example, in which base station device 100 includes the four antennas. However, this is not restrictive. For example, it may include eight antennas, which may be divided into two groups each including four, or may be divided into four groups each including two. Thus, it is merely required to divide the number of antennas for effectively utilizing radio frequencies.

The embodiment has been described in connection with the example, in which the base station device performs the adaptive array operation with the plurality of antennas. However, this is not restrictive. For example, diversity such as selection diver or composite diver may be employed. Thus, the following manner is merely required. In the operation using all the antennas, the operation is performed with the local frequency signal provided from one local oscillation unit. In the operation using the plurality of groups, the operation is performed with the local frequency signals provided from the plurality of local oscillation units.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A base station device comprising:
   a plurality of local oscillation units generating local frequency signals;
   a plurality of radio units using said local frequency signals as input for operation;
   a path switching switch arranged between said plurality of local oscillation units and said plurality of radio units for selecting connections between said local oscillation units and said radio units;
   a transmission/reception form switching control unit performing switching between a transmission/reception operation using the same frequency in all the plurality of radio units and a transmission/reception operation performed by dividing said plurality of radio units into a plurality of groups and using different frequencies in the respective groups; and
   a path switching control unit controlling said path switching switch to connect the one local oscillation unit to all the radio units when said transmission/reception form switching control unit performs the transmission and reception by all the radio units, and controlling the path switching switch to connect the different local oscillation units corresponding to the respective groups to the radio units, respectively, when said transmission/reception form switching control unit performs the transmission and reception by each of the groups.

2. The base station device according to claim 1, further comprising:
   a power supply control unit controlling supply of a power to said local oscillation unit, wherein
   said power supply control unit controls said path switching switch to shut off the power to the local oscillation unit not connected to said radio unit.

3. The base station device according to claim 1, wherein
   said transmission/reception form switching control unit performs selection on a slot-by-slot basis of a radio signal to select the transmission/reception operation by all the radio units or the transmission/reception operation by the radio units corresponding to each of the groups.

4. The base station device according to claim 1, further comprising:
   a storage unit storing correction information for radio characteristics corresponding to the number of the paths set by said path switching control unit between said plurality of local oscillation units and said plurality of radio units, wherein
   said storage unit commonly uses the correction information for the path(s) included in the paths between said local oscillation units and said radio units and commonly used in both the case of the transmission/reception operation by all the radio units and the case of the transmission/reception operation by the radio units corresponding to each of the groups.

* * * * *